April 4, 1961
W. R. RABSON
2,978,585
NEUTRON CALIBRATION METHOD AND APPARATUS
Original Filed May 2, 1955
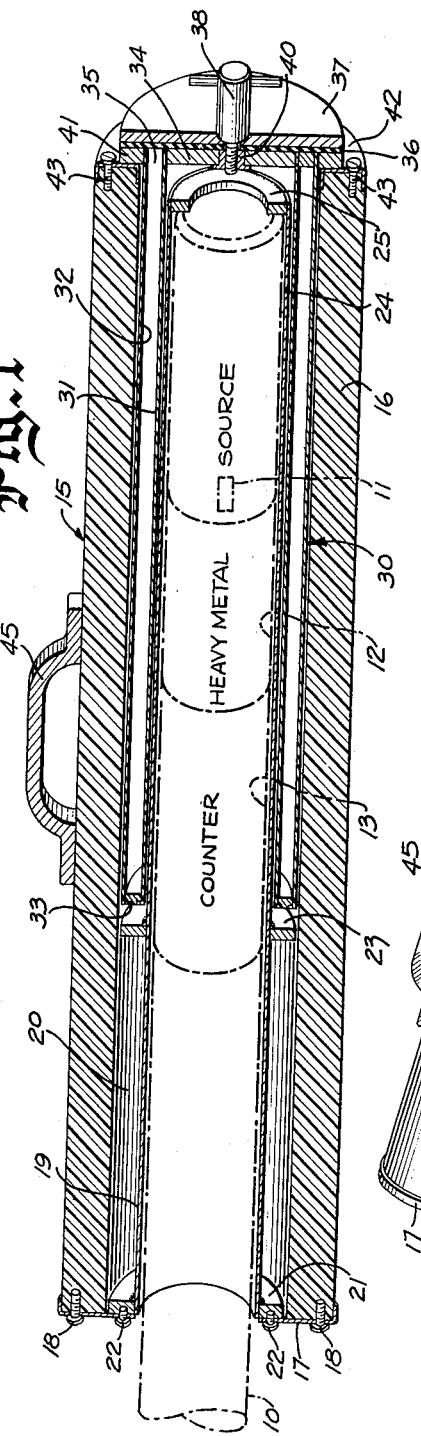
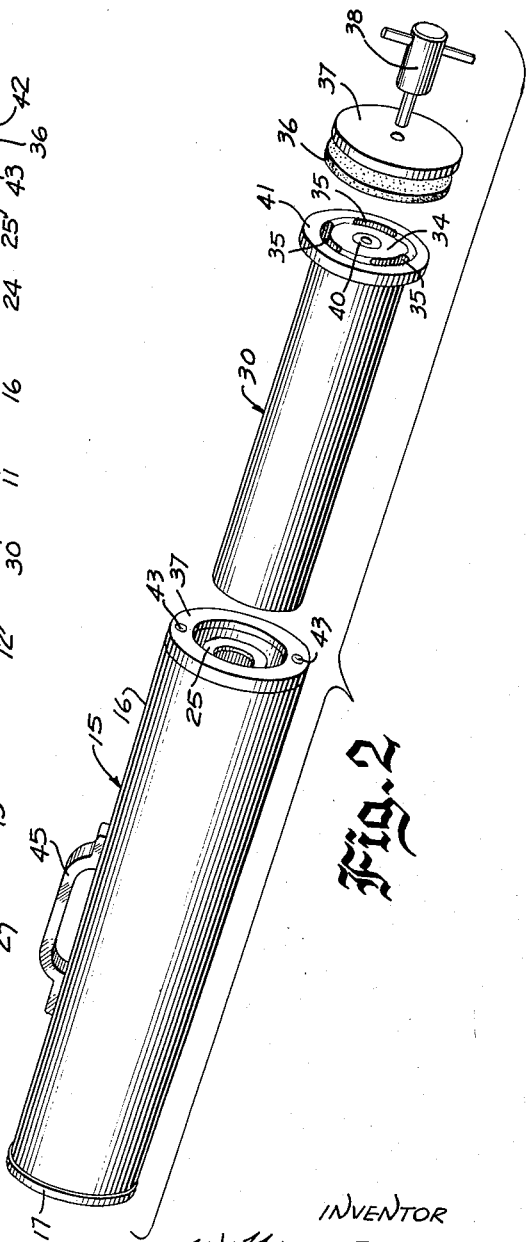
INVENTOR
William R. Rabson
BY
Mason, Kolehmainen, Rathburn and Wyss
ATTORNEYS

United States Patent Office 2,978,585
Patented Apr. 4, 1961

2,978,585

NEUTRON CALIBRATION METHOD AND APPARATUS

William R. Rabson, Houston, Tex., assignor, by mesne assignments, to PGAC Development Company, Houston, Tex., a corporation of Texas Continuation of application Ser. No. 505,215, May 2, 1955. This application Mar. 13, 1958, Ser. No. 721,318

9 Claims. (Cl. 250—83)

The present invention relates to radioactivity well logging systems, and, more particularly, to a method and apparatus for calibrating a radioactivity well logging system of the type provided with a subsurface unit including a source of neutrons and a neutron detector, and surface facilities for logging the response of the neutron detector within a borehole. Specifically, the present invention is an improvement of the radioactivity well logging system disclosed and described in detail in a patent of Serge A. Scherbatskoy, Patent No. 2,816,235, issued December 10, 1957, which patent is assigned to the same assignee as the present invention, and the present invention is a continuation of my copending application Serial No. 505,215, filed May 2, 1955, now abandoned.

In the above identified Scherbatskoy patent there is disclosed a neutron calibration method and apparatus wherein compensation is made for differences in the efficiency and spectral response encountered in various subsurface units and an arrangement is provided whereby each instrument may be checked in a standard surrounding medium and the neutron response of the system adjusted to a standard output value so as to compensate for all variables in instrumentation. While the system disclosed in the above identified application is suitable for its intended purpose, it has been found that in order to make accurate porosity determinations from the neutron log, there are several additional factors involved which vary from well to well. These factors include the diameter of the borehole, the size and weight or density of the casing and the type of fluid used in the casing or borehole. While compensation for the first two of these factors may be made from information normally available by the well history, the third factor, i.e., the type of well fluid present in the casing or the borehole, introduces a more difficult problem since the neutron detector normally employed in such systems responds to thermal energy neutrons as well as epithermal neutrons and, hence, is affected by any material surrounding the detector which tends to absorb neutrons. It has been found that well fluid has a marked influence on the neutron log when it contains salt since chlorine has a large capture cross section for thermal neutrons and, hence, absorbs a portion of the thermal neutron flux produced in the surrounding medium by the action of hydrogen atoms on the high energy neutrons emitted from the neutron source.

It is, therefore, an object of the present invention to provide a new and improved neutron calibration method and apparatus for radioactivity well logging system wherein compensation for neutron absorption by the well fluid is provided.

It is a further object of the present invention to provide a new and improved neutron calibration method and apparatus for a radioactivity well logging system wherein accurate determination of the porosity of the formations logged can be obtained.

It is another object of the present invention to provide a neutron calibration method and apparatus for a radioactivity well logging system wherein a neutron log is obtained which is identical in character and absolute value in standard units to a neutron log produced in the same well with fresh water in the borehole.

The invention, both as to its organization and method of operation, together with further objects and advantages thereof, will best be understood by reference to the following specification taken in connection with the accompanying drawing, in which:

Fig. 1 is a perspective view of the neutron calibration apparatus of the present invention which is sectioned along the longitudinal axis of the device and is shown inserted over the end of the subsurface unit of the radioactivity well logging system; and Fig. 2 is an exploded view of the component parts of the calibrator device of Fig. 1.

Referring now to the drawing, the neutron calibration method and apparatus of the present invention is particularly designed for use in conjunction with a radioactivity well logging system of the type which includes a cylindrical subsurface unit 10 within which are positioned a neutron source 11, a heavy metal shield 12 and a neutron detector or counter 13, it being understood that the subsurface unit 10 may also include other facilities for obtaining another radioactivity log simultaneously as described in detail in the above identified U.S. Letters Patent No. 2,816,235, issued December 10, 1957.

In order to provide uniform neutron logs with different subsurface units in different wells, it is necessary to compensate for the factors of (1) the intensity and the energy spectrum of the neutrons emitted by the neutron source 11, (2) the distance between the source 11 and the neutron detector 13, (3) the characteristics of the heavy metal shield 12, and (4) the sensitivity of the neutron detector 13. As described in detail in the above identified U.S. Letters Patent, compensation for these factors may be provided by employing a calibration unit which is itself adjusted to provide a standard neutron attenuation so that the neutron response in counts per second from any subsurface unit represents a standard set of conditions. More particularly, a calibration device indicated generally at 15, which includes a tubular body 16 of neutron absorbing material such as a paper base phenolic resin, is slipped over the end of the subsurface unit 10 while this unit is held in horizontal position at the earth's surface, the unit 10 being connected to the surface equipment of the radioactivity well logging system so that the neutron calibrating operation is performed under actual operating conditions. The tubular body 16 is arranged to provide a predetermined attenuation for the neutrons emitted by the neutron source 11 within the subsurface unit 10 and the amount of attenuation provided by the tubular body 16 is preferably a fixed multiple of a known and reproducible standard. For example, the tubular body 16 may be arranged to provide an attenuation which is a fixed multiple of the attenuation produced when the subsurface unit 10 is immersed in a body of distilled water. The sensitivity of neutron response of the well logging system is then adjusted to provide a standard output value when the tubular body 16 surrounds the indicated portion of the subsurface unit 10.

While such an arrangement suitably compensates for the above described factors which may be termed instrumentation errors of the system, it is also necessary to take into consideration the effect of the well fluid which surrounds the subsurface unit 10 when it is lowered into a cased well or borehole. The well fluid produces a particularly undesirable effect on the neutron log when it includes a salt since chlorine has a high capture cross section for neutrons and, hence, produces a substantial attenuation of thermal energy neutrons which otherwise would be received by the neutron detector 13. In accordance with the present invention, facilities are provided for compensating for the neutron absorbing characteristic of the well fluid so that an accurate neutron log can be obtained. More particularly, facilities are provided for first obtaining the neutron response of the system when the subsurface unit 10 is positioned within a body of fresh water and for obtaining the neutron response of the system when the subsurface unit 10 is positioned within a body of well fluid taken from the well which is to be logged. The sensitivity of neutron response of the system is then readjusted in accordance with deviations of the well fluid response from the fresh water response so that a neutron log can be obtained which is substantially identical to a neutron log produced in the same well with fresh water in the borehole.

In order to provide the above described well fluid compensation, the tubular body 16 is provided with an end plate 17 which is secured to the body 16 by means of the screws 18 and supports one end of the inner tube 19, the tube 19 having an inner diameter which is slightly larger than the outside diameter of the subsurface unit 10 and having an outer diameter substantially smaller than the inner diameter of the tubular body 16 so as to define an annular space 20 between the members 19 and 16. An annular member 21 is secured to one end of the tube 19 and is secured to the end plate 17 by means of the screws 22 and an annular spaced member 23 is secured to the tube 19 intermediate the ends thereof so as to position the tube 19 concentrically with respect to the tubular body 16, the end portion 24 of the tube 19 being unsupported and having an annular stop member 25 secured at the extremity thereof.

A fluid-tight container indicated generally at 30 is provided to fit in the annular space 20 and comprises an inner sleeve 31 and an outer sleeve 32 which are connected together at one end thereof by means of the annular bottom member 33 and are connected together at the other end thereof by means of the top member 34, the member 34 being provided with openings 35 which may be sealed by means of a gasket 36 which is secured to a cover member 37. A thumbscrew 38 may be inserted through central openings in the cover 37 and the gasket 36 and threaded into a flanged member 40 which is mounted in the center of the top plate 34 so that the cover 37 may be securely clamped in position with the gasket 36 sealing the openings 35. The top member 34 is provided with a flange portion 41 which engages the end plate 42, secured to the tubular body 16 by means of the screws 43, when the container 30 is inserted into the annular space 20 in the manner shown in Fig. 1. Preferably, the members 19, 31, 32, 33 and 34 are all made of aluminum or other suitable material which is substantially inert to neutrons so that these members will not themselves produce additional neutron attenuation. A suitable handle 45 may be secured to the tubular body 16 by any convenient means so that the calibrating device 15 can be readily manipulated.

In performing the neutron calibration method of the present invention, the calibrating unit 15 is first positioned about the end of the subsurface unit 10 in the manner shown in Fig. 1 with the container 30 completely removed from within the tubular body 16. The neutron response produced when the tubular body 16 surrounds the source 11 and the counter 13 is adjusted, by means of the sensitivity control described in more detail in the above identified U.S. letters patent, to a standard output value as, for example, 100 standard units. The container 30 is then filled with fresh water and the cover plate 37 clamped on the end thereof so as to seal the openings 35 after which the container 30 is inserted in the annular space 20 between the inner tube 19 and the tubular body 16. The fresh water neutron response of the radioactivity well logging system is thereafter obtained and is preferably recorded in the recorder portion of the radioactivity well logging system. The container 30 is then removed, emptied, and is then filled with a representative sample of well fluid taken from the well which is to be logged by the subsurface unit 10. The cover plate 37 is again clamped in place to seal the container 30 and this container is then reinserted into an annular space 30 and the well fluid neutron response of the system is obtained and recorded in the recorder portion of the system. Any difference between the response obtained with fresh water in the container 30 and the response obtained with well fluid in the container 30 indicates a difference in the neutron absorption and attenuation of the two fluids. The sensitivity control of the radioactivity well logging system is then readjusted in accordance with the inequality of the fresh water neutron response and the well fluid neutron response so as to compensate for any differences between the well fluid and fresh water insofar as neutron attenuation is concerned. After this readjustment of the sensitivity control has been made, the calibrating unit 15 is removed from the end of the subsurface unit 10, the unit 10 is lowered into the borehole and a neutron log is obtained in a conventional manner. The neutron log thus obtained is substantially identical in character and absolute value in standard units to a neutron log produced in the same well with fresh water in the bore hole. Accordingly, this neutron log may be compared directly with neutron logs obtained from other wells having well fluids of different characteristics and accurate information as to the formations logged thereby may be obtained.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a radioactivity well logging system of the type comprising a subsurface unit provided with a source of neutrons and a detector of radiations due to neutron bombardment of the formations and including facilities for logging the radiation response of said detector within a borehole, the method of calibrating said logging system to a fixed standard which comprises the steps of positioning said subsurface unit within a calibrating device adapted to provide a predetermined attenuation of the neutrons emitted by said source, adjusting the radiation response of said system to a standard output value, positioning a body of fresh water adjacent said subsurface unit to obtain a fresh water radiation response of said system, positioning a body of well fluid adjacent said subsurface unit to obtain a well fluid radiation response of said system, and adjusting the sensitivity of radiation response of said system to compensate for inequality of said fresh water radiation response and said well fluid radiation response.

2. In a radioactivity well logging system of the type comprising a subsurface unit provided with a source of neutrons and a detector of radiations due to neutron bombardment of the formations and including facilities for logging the radiation response of said detector within a borehole, the method of calibrating said logging system to a fixed standard which comprises the steps of positioning said subsurface unit within a calibrating device adapted to provide a predetermined attenuation of the neutrons emitted by said source, adjusting the radiation response of said system to a standard output value, positioning a body of fresh water between said calibrating device and said subsurface unit to obtain a fresh water radiation response of said system, positioning a body of well fluid between said calibrating device and said subsurface unit to obtain a well fluid radiation response of said system, and adjusting the sensitivity of radiation response of said system to compensate for inequality of said fresh water radiation response and said well fluid radiation response.

3. In a radioactivity well logging system of the type comprising a subsurface unit provided with a source of neutrons and a detector of radiations due to neutron bombardment of the formations and including facilities for logging the radiation response of said detector within a borehole, the method of calibrating said logging system to a fixed standard which comprises the steps of adjusting the sensitivity of radiation response of said system to a standard output value, obtaining the radiation response of said system when said subsurface unit is positioned within a body of fresh water and when said subsurface unit is positioned within a body of well fluid taken from the well to be logged, and readjusting the sensitivity of radiation response of said system to compensate for inequality of said fresh water and well fluid radiation responses.

4. A calibrating device for calibrating a radioactivity well logging system of the type comprising a cylindrical subsurface unit adapted to be lowered into a borehole and provided with a neutron source and a detector of radiations due to neutron bombardment of the formations and including surface equipment for logging the radiation response of said detector within the borehole, comprising an elongated tubular body of neutron interactive material, means for positioning said subsurface unit within said tubular body in substantially concentric relation thereto, and an elongated annular fluid-tight container adapted to be inserted into the annular space between said subsurface unit and said tubular body.

5. A calibrating device for calibrating a radioactivity well logging system of the type comprising a cylindrical subsurface unit adapted to be lowered into a borehole and provided with a neutron source and a detector of radiations due to neutron bombardment of the formations and including surface equipment for logging the radiation response of said detector within the borehole, comprising an elongated tubular body of neutron interactive material, means for positioning said subsurface unit within said tubular body in substantially concentric relation thereto, and an elongated annular fluid-tight container of a material which is substantially inert to neutrons which is adapted to be inserted into the annular space between said subsurface unit and said tubular body.

6. A calibrating device for calibrating a radioactivity well logging system of the type comprising a cylindrical subsurface unit adapted to be lowered into a borehole and provided with a neutron source and a detector of radiations due to neutron bombardment of the formations and including surface equipment for logging the radiation response of said detector within the borehole, comprising an elongated tubular body of neutron interactive material, an inner tube positioned within said tubular body in substantially concentric relation therewith and having a stop member at one end thereof, said inner tube having an inner diameter just slightly larger than the outside diameter of said subsurface unit so that said inner tube may be inserted on the end of said subsurface unit with said one end of said subsurface unit in engagement with said stop member, and an elongated annular fluid container adapted to be inserted between said inner tube and said tubular body.

7. A calibrating device for calibrating a radioactivity well logging system of the type comprising a cylindrical subsurface unit adapted to be lowered into a borehole and provided with a neutron source and a detector of radiations due to neutron bombardment of the formations and including surface equipment for logging the radiation response of said detector within the borehole, comprising an elongated tubular body of neutron interactive material, an inner tube positioned within said tubular body in substantially concentric relation therewith and having a stop member at one end thereof, said inner tube having an inner diameter just slightly larger than the outside diameter of said subsurface unit so that one end of said subsurface unit may be inserted into said inner tube at one end of said tubular body and positioned with said one end of said subsurface unit in engagement with said stop member, and an elongated annular fluid container adapted to be inserted into the other end of said tubular body in the annular space between said body and said inner tube to a depth sufficient to surround the neutron source and radiation detector positioned within said subsurface unit.

8. In a radioactivity well logging system of the type comprising a subsurface unit provided with a source of neutrons and a detector of radiations due to neutron bombardment of the formations and including facilities for logging the radiation response of said detector within a borehole, the method of calibrating said logging system to a standard calibration index which comprises the steps of positioning said subsurface unit within a first calibrating assembly, obtaining a first response of said system as influenced by said first calibrating assembly, positioning said subsurface unit within a second calibrating assembly, said second calibrating assembly providing a different total neutron reactivity with said system than said first calibrating assembly, obtaining a second response of said system as influenced by said second calibrating assembly, and adjusting the response of said system to compensate for variations in the difference between said first and second responses.

9. In a radioactivity well logging system of the type comprising a subsurface unit provided with a source of neutrons and a detector of radiations due to neutron bombardment of the formations and including facilities for logging the radiation response of said detector within a borehole, the method of calibrating said logging system to a standard calibration index which comprises the steps of positioning said subsurface unit within a first calibraitng assembly comprising two bodies of neutron reactive material, obtaining a first response of said system as influenced by said first calibrating assembly, positioning said subsurface unit within a second calibrating assembly also comprising two bodies of neutron reactive material, said second calibrating assembly providing a different total neutron reactivity with said system than said first calibrating assembly, obtaining a second response of said system as influenced by said second calibrating assembly, and adjusting the response of said system to compensate for variations in the difference between said first and second responses.

References Cited in the file of this patent
UNITED STATES PATENTS 2,666,142  Herzog _____ Jan. 12, 1954